Patented Aug. 5, 1947

2,425,134

UNITED STATES PATENT OFFICE 2,425,134

METHOD OF SEPARATING MAGNETIC IRON OXIDE SCALE FROM AN IRON-CONTAINING METAL

Harold A. Strickland, Jr., Detroit, Mich., assignor, by mesne assignments, to The Budd Company, Philadelphia, Pa., a corporation of Pennsylvania No Drawing. Application September 29, 1945, Serial No. 619,427

1 Claim. (Cl. 134—19)

This invention relates to the removal of scale formed usually by oxidation on metal surfaces, with particular application to the removal of scale from magnetic iron oxide $Fe_3O_4$.

In metallurgical processes requiring the heating of metal, such as iron or steel, to temperatures at or above red heat, the problem frequently arises of removal of scale formed on the metal surface. This scale usually consists of an oxide of the metal, such as magnetic iron oxide, and removal has usually been accomplished by mechanical means, by the employment of acid baths or atmospheres in conjunction with mechanical action, or by the combination of high heat with water jets bringing about a sudden change in temperature combined with mechanical removing force.

In experimentation in connection with this problem it has been ascertained that the scale may be removed in a very simple and yet effective fashion according to the following method, the description being confined to the treatment of iron-containing products on which a scale of magnetic oxide $Fe_3O_4$ is formed.

Assuming the metal to be at room temperature, it is placed in an oven or other heating chamber where the heat available as provided by any desirable means is sufficient to bring the surface mass of the metal to a temperature in a range of approximately 150° to 500° F. within a time period of less than one second. I have found inductive heating to be satisfactory for this purpose. After this heat application the metal is allowed to cool to room temperature. As a result of the sudden application of heat the scale on the metal separates from the metal itself. This is believed to be due to the difference in the rate of expansion of the iron or steel as compared to the rate of expansion of the iron oxide. While there may be some difference in temperature between the scale and the base metal, in view of the close contact and adherence of the scale, it is believed that this temperature difference is insignificant within the limits of heat treatment, the difference in expansion due to the difference in coefficients causing the indicated result.

The method as described is pronouncedly simple and definitely effective in securing a separation of the scale from the surface, and while it has particular utility as applied to iron or steel products carrying a scale of magnetic oxide, obviously the method is applicable to other metals and non-metal materials having scale-forming properties wherein the scale is closely adherent on the base and these parts possess a pronounced difference in the coefficients of expansion.

What is claimed is:

The method of separating magnetic iron oxide scale from an iron-containing metal on which said scale is formed through heat treatment which comprises heating the scale-coated surface of the metal within a time period of less than one second from room temperature to a temperature within a range of 150° to 500° F., and permitting the metal surface to return to room temperature.

HAROLD A. STRICKLAND, JR.

REFERENCES CITED

The following references are of record in the file of this patent:

UNITED STATES PATENTS

| Number | Name | Date |
|---|---|---|
| 2,058,388 | Rendleman | Oct. 20, 1936 |
| 2,337,087 | Deck | Dec. 21, 1943 |